United States Patent
Lynch

(10) Patent No.: US 7,986,178 B2
(45) Date of Patent: Jul. 26, 2011

(54) PULSE WIDTH MODULATION DRIVER FOR ELECTROACTIVE LENS

(75) Inventor: Scott Lynch, Half Moon Bay, CA (US)

(73) Assignee: Supertex, Inc., Sunnyvale, CA (US)

( * ) Notice: Subject to any disclaimer, the term of this patent is extended or adjusted under 35 U.S.C. 154(b) by 183 days.

(21) Appl. No.: 12/331,353

(22) Filed: Dec. 9, 2008

(65) Prior Publication Data

US 2009/0153208 A1 Jun. 18, 2009

Related U.S. Application Data

(60) Provisional application No. 61/013,967, filed on Dec. 14, 2007.

(51) Int. Cl.
*H03K 3/017* (2006.01)
(52) U.S. Cl. ......................... 327/172; 327/175
(58) Field of Classification Search .................. None
See application file for complete search history.

(56) References Cited

U.S. PATENT DOCUMENTS

| 6,661,415 | B1 * | 12/2003 | Yasuda et al. ................. 345/213 |
| 7,365,786 | B2 * | 4/2008 | Kohno et al. ................. 348/314 |
| 7,496,289 | B2 * | 2/2009 | Yamazaki ....................... 396/55 |
| 7,550,707 | B2 * | 6/2009 | Hashimoto et al. ........... 250/221 |
| 7,612,356 | B2 * | 11/2009 | Utida et al. .................... 250/573 |
| 7,675,548 | B2 * | 3/2010 | Yamazaki .................. 348/208.7 |
| 7,679,646 | B2 * | 3/2010 | Lee et al. ................... 348/208.2 |
| 7,683,975 | B2 * | 3/2010 | Kageyama ..................... 349/33 |
| 2006/0268145 | A1 * | 11/2006 | Moon et al. ................... 348/340 |
| 2007/0213776 | A1 * | 9/2007 | Brink ................................ 607/7 |
| 2007/0279539 | A1 * | 12/2007 | Suzuki et al. ..................... 349/1 |

FOREIGN PATENT DOCUMENTS

EP 1835313 A1 * 9/2007

* cited by examiner

*Primary Examiner* — Cassandra Cox
(74) *Attorney, Agent, or Firm* — Jeffrey D. Moy; Weiss & Moy, P.C.

(57) ABSTRACT

An electroactive lens driver generates a variable root-mean-square drive voltage for controlling an electroactive lens by controlling the duty cycle of a modified square wave.

19 Claims, 6 Drawing Sheets

PULSE WIDTH MODULATION DRIVER FOR ELECTROACTIVE LENS

RELATED APPLICATION

This application claims the benefit of U.S. Provisional Application No. 61/013,967, filed Dec. 14, 2007, which is incorporated herein by reference in its entirety.

TECHNICAL FIELD

This invention relates to electroactive lens drivers, and more particularly to pulse width modulated electroactive lens drivers.

BACKGROUND

Present focusing and zooming functions of optical systems involve the mechanical positioning of lens elements relative to each other. This has the disadvantages of mechanical complexity, bulkiness, and, when electrically operated, high power consumption. The trend towards smaller cameras, especially those used in cell phones, has driven the need for smaller, more compact, and power-efficient optical systems. This has spurred the development of lens elements that change focal length without the need for conventional mechanical positioning. One type of such a lens is the electroactive lens, which changes focal length with the application of voltage. In many instances, the electroactive lens responds primarily to the RMS value of the applied signal regardless of wave shape. Electroactive lenses include liquid lenses and liquid crystal lenses.

SUMMARY

An electroactive lens driver comprises a switch matrix output stage and a pulse width modulator. The pulse width modulator controls the switch matrix output stage to provide a pulsed voltage signal to the electroactive lens and to vary a duty cycle of the pulsed voltage signal. The variation in duty cycle varies the RMS value of the signal applied to the electroactive lens, thus effecting focal length control.

DETAILED DESCRIPTION

Figure 1:
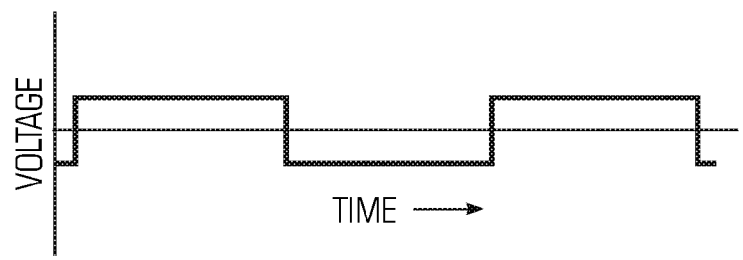
FIG. 1 is a timing diagram illustrating a peak amplitude modulated low RMS amplitude square wave of an AC voltage for driving an electroactive lens.
Figure 2:
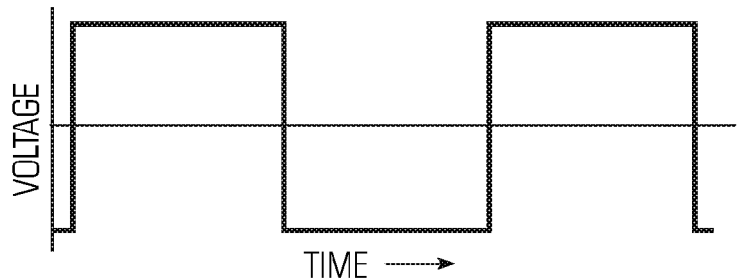
FIG. 2 is a timing diagram illustrating a peak amplitude modulated high RMS amplitude square wave of an AC voltage for driving an electroactive lens.
Figure 5:
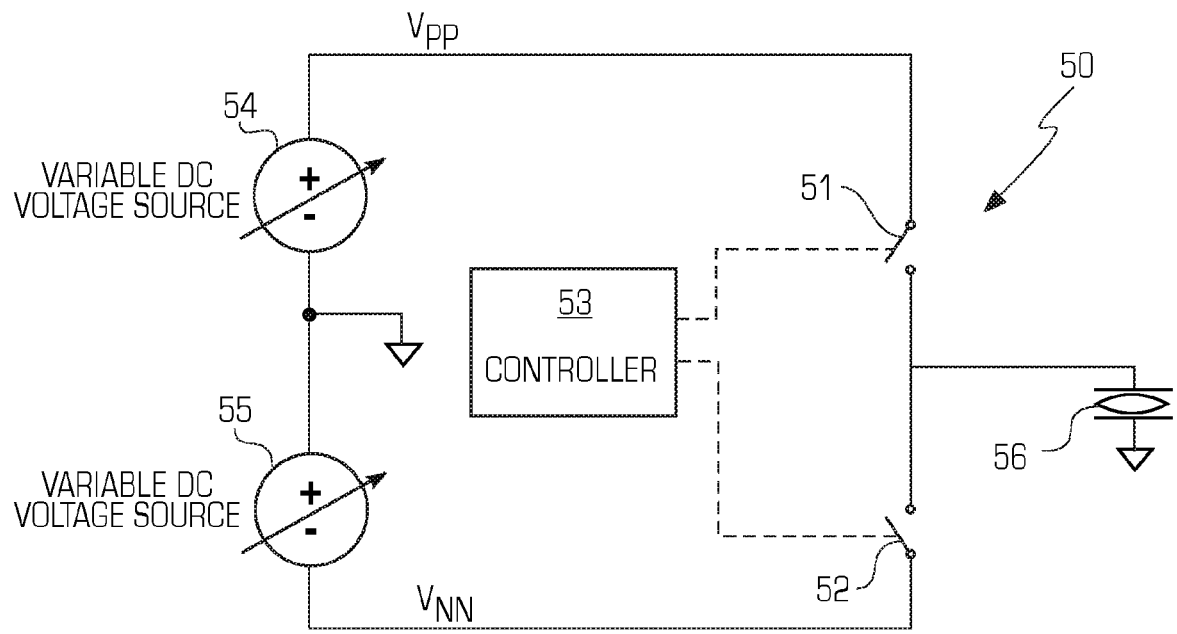
FIG. 5 is a schematic diagram illustrating a conventional pulse amplitude modulation driver including a plurality of variable voltage DC sources and a switching matrix.
Figure 7:
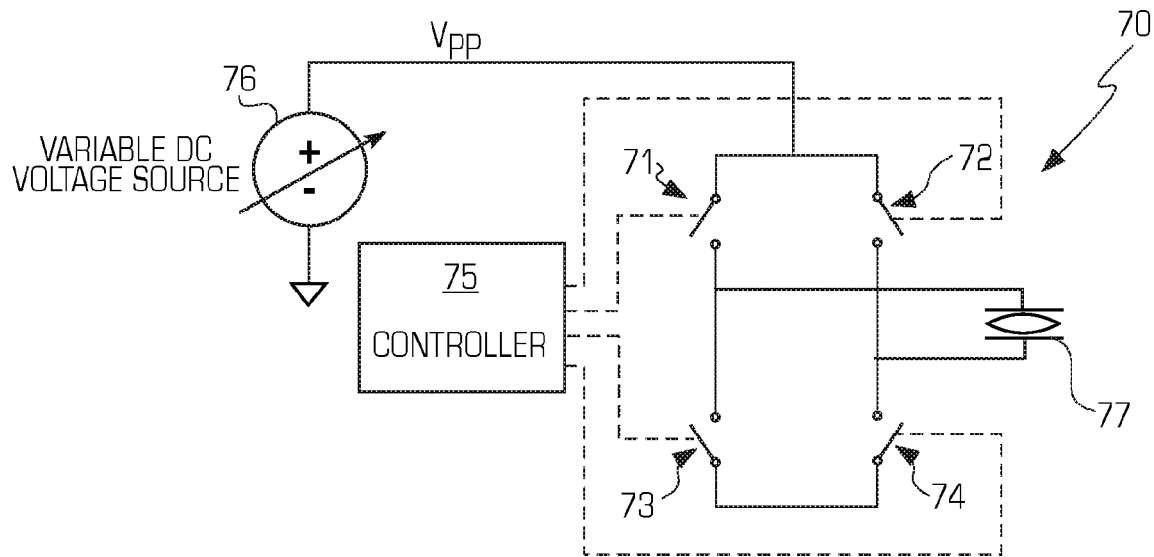
FIG. 7 is a schematic diagram illustrating a conventional pulse amplitude modulation driver including a variable voltage DC source and an H-bridge switch matrix.

Some electroactive lenses respond to the root-mean-square (RMS) value of an applied AC voltage. The focal length of the electroactive lens is continuously varied by controlling the RMS value of the applied AC voltage. In a conventional approach, the electroactive lens is driven with a bipolar square wave, with an RMS voltage controlled by varying the peak amplitude of the square wave. FIG. 1 is a timing diagram illustrating a peak amplitude modulated low RMS amplitude square wave. FIG. 2 is a timing diagram illustrating a peak amplitude modulated higher RMS amplitude square wave obtained by varying the peak voltage. This peak amplitude modulation (PAM) approach can be generated by a driver including a variable voltage DC source and a switching matrix to convert the DC voltage to an AC voltage, as shown in FIGS. 5 and 7. The drive voltage, expressed as VRMS, is the peak voltage (VPK) of the square wave: VRMS=VPK.

FIG. 5 is a schematic diagram illustrating a conventional pulse amplitude modulation driver including a plurality of variable voltage DC sources and a switching matrix. The pulse amplitude modulation driver includes a half-bridge switch matrix 50, a controller 53, and a plurality of variable DC voltage sources 54 and 55 for driving an electroactive lens 56. The controller 53 controls the half-bridge switch matrix 50 to alternately reverse the polarity of the voltage wave form applied to the electroactive lens 56. The half-bridge switch matrix 50 comprises a plurality of switches 51 and 52. The controller 53 provides control signals to the half-bridge switch matrix 50 for opening and closing the switches 51 and 52 for selectively coupling a positive variable voltage Vpp (from the variable DC voltage source 54) or a negative variable voltage −Vnn (from the variable DC voltage source 55), respectively, to the electroactive lens 56. In one embodiment, the variable DC voltage sources 54 and 55 provide voltages of equal magnitude, but of opposite polarity.

Figure 6:
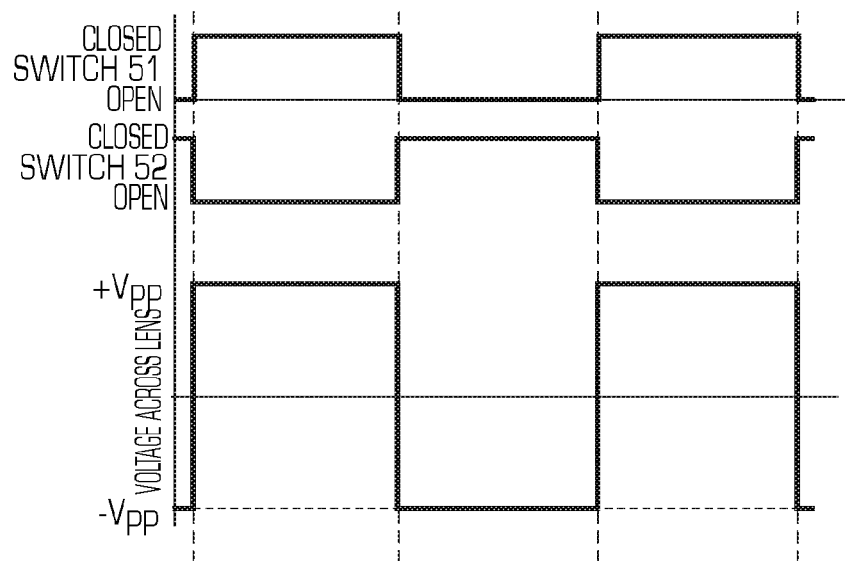
FIG. 6 is a timing diagram illustrating timing of control signals of switches of and a control voltage from the pulse amplitude modulation driver of FIG. 5.

FIG. 6 is a timing diagram illustrating timing of control signals of the switches 51 and 52 and the control voltage from the pulse amplitude modulation driver of FIG. 5.

FIG. 7 is a schematic diagram illustrating a conventional pulse amplitude modulation driver including a variable voltage DC source and an H-bridge switch matrix. The pulse amplitude modulation driver comprises an H-bridge switch matrix 70, a controller 75, and a variable DC source 76 for driving an electroactive lens 77. The controller 75 controls the H-bridge switch matrix 70 to alternately reverse the polarity of the voltage wave form applied to the electroactive lens 77. The H-bridge switch matrix 70 comprises a plurality of switches 71, 72, 73, and 74. The controller 75 provides control signals to the H-bridge switch matrix 70 for opening and closing the switches 71, 72, 73, and 74 for selectively coupling a variable voltage Vpp from the variable DC voltage source 76 and ground to the electroactive lens 77.

Figure 8:
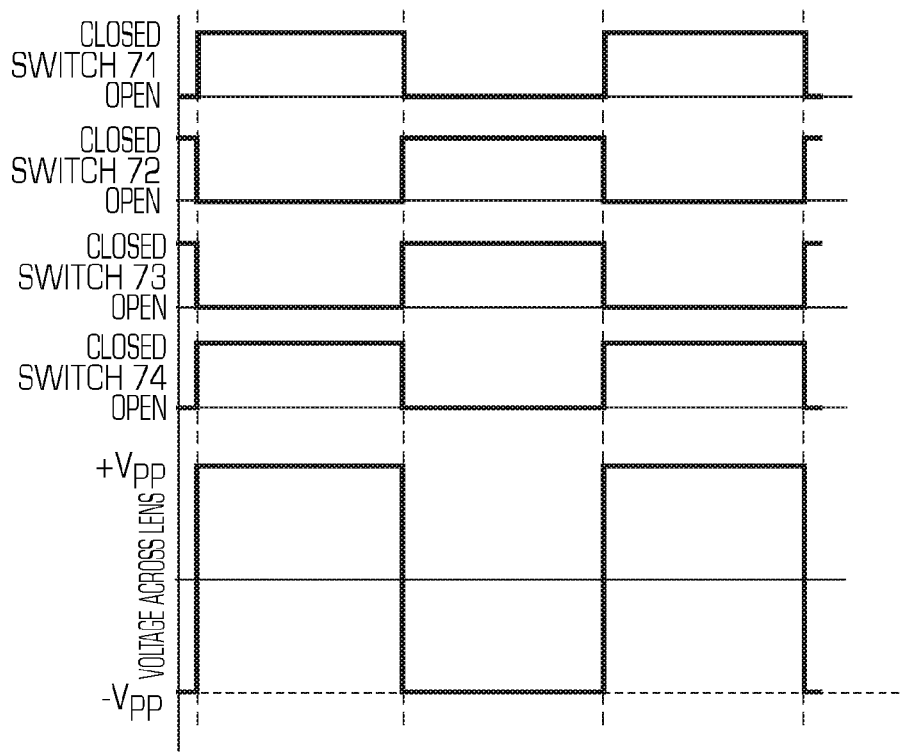
FIG. 8 is a timing diagram illustrating timing of control signals of switches of and a control voltage from the pulse amplitude modulation driver of FIG. 7.

FIG. 8 is a timing diagram illustrating timing of control signals of switches of 71, 72, 73, and 74 and a control voltage from the pulse amplitude modulation driver of FIG. 7.

A DC voltage source 76 that provides a variable output voltage adds circuit complexity and cost. A driver technique that operates from a fixed voltage source has the benefits of fewer components and lower cost.

The digital control of a variable voltage DC source generally uses a low voltage digital-to-analog converter (DAC) combined with a higher voltage gain stage. This accounts for added complexity and cost. In one embodiment, the driver of the present invention does not use a digital-to-analog converter.

The driver of the present invention varies the RMS drive voltage by maintaining a constant peak output voltage and varying the duty cycle. Variable duty cycle is known as pulse width modulation (PWM).

Figure 3:
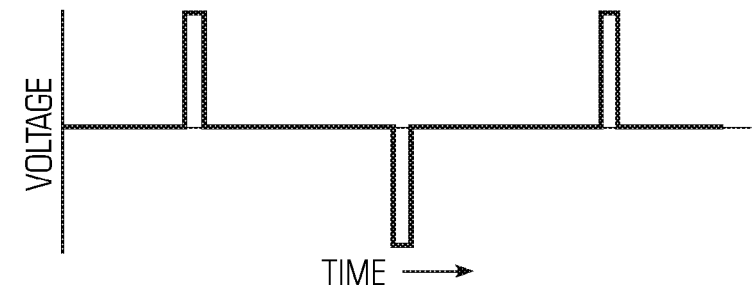
FIG. 3 is a timing diagram illustrating a pulse width modulated low RMS amplitude square wave of an AC voltage for driving an electroactive lens in accordance with the present invention.
Figure 4:
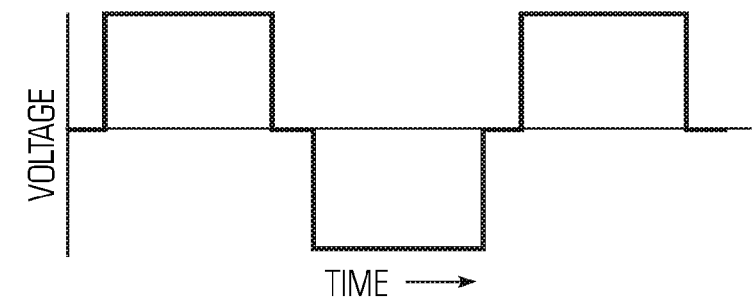
FIG. 4 is a timing diagram illustrating a pulse width modulated high RMS amplitude square wave of an AC voltage for driving an electroactive lens in accordance with the present invention.

FIG. 3 is a timing diagram illustrating a pulse width modulated low RMS amplitude square wave of an AC voltage for driving an electroactive lens. FIG. 4 is a timing diagram illustrating a pulse width modulated high RMS amplitude square wave of an AC voltage for driving an electroactive lens in accordance with the present invention. Both the high and low RMS waveforms of FIGS. 3 and 4 have the same peak amplitude, allowing the use of fixed-value DC voltage supplies.

One advantage of PWM RMS amplitude control versus PAM control is the elimination of a DC voltage supply that is variable; instead the DC voltage supply has a fixed value. This reduces circuit complexity and size, allowing an integrated lens driver to be located inside a small camera module. A reduced circuit size also reduces die size, lowering per-die costs.

Another advantage of PWM RMS amplitude control versus PAM control is a more precise output frequency. An oscillator integrated on-chip either typically exhibits a wide tolerance of frequency or uses expensive trimming. Because the electroactive lens is a capacitive load, it consumes more power as drive frequency increases. In one embodiment, the high voltage supply provides sufficient power for the worst-case highest drive frequency. On the other hand, if the clock for the drive frequency is provided from a precision external source, as commonly found in digital systems, then the high voltage supplies may be designed smaller and thus less costly.

Figure 9:
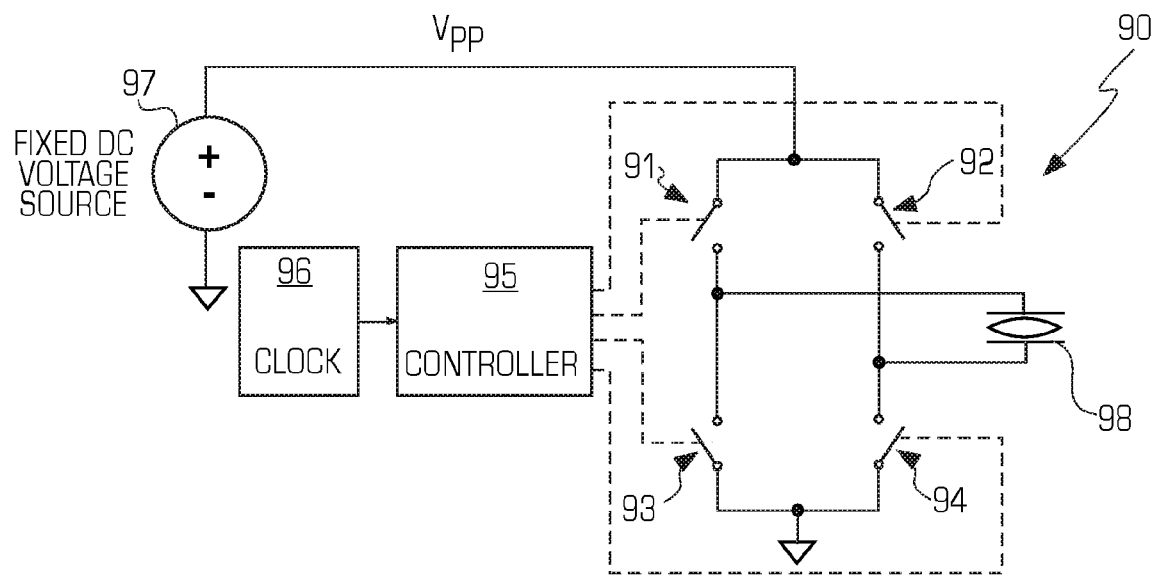
FIG. 9 is a schematic diagram illustrating a pulse width modulation driver receiving a single fixed DC voltage in accordance with the present invention.

FIG. 9 is a schematic diagram illustrating a pulse width modulation driver receiving a single fixed DC voltage in accordance with the present invention. The pulse width modulation driver comprises an H-bridge switch matrix 90, a controller 95, a clock 96, and a fixed DC voltage source 97 for driving an electroactive lens 98. The controller 95 controls the H-bridge switch matrix 90 to vary the duty cycle of the voltage waveform applied to the electroactive lens 98. The H-bridge switch matrix 90 comprises a plurality of switches 91, 92, 93, and 94. The controller 95 provides control signals to the H-bridge switch matrix 90 for opening and closing the switches 91, 92, 93, and 94 for selectively coupling a fixed voltage Vpp from the fixed DC voltage source 97 and ground to the electroactive lens 98.

Figure 10:
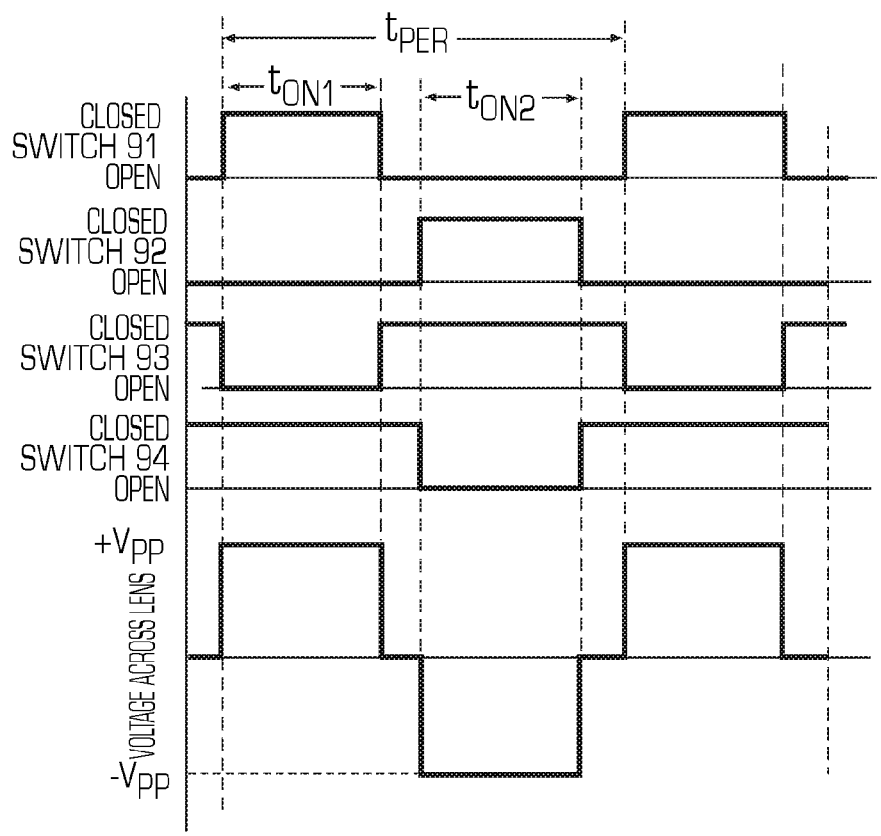
FIG. 10 is a timing diagram illustrating timing of control signals of switches of and control voltage from the pulse width modulation driver of FIG. 9 when providing a relatively high RMS amplitude output voltage.
Figure 11:
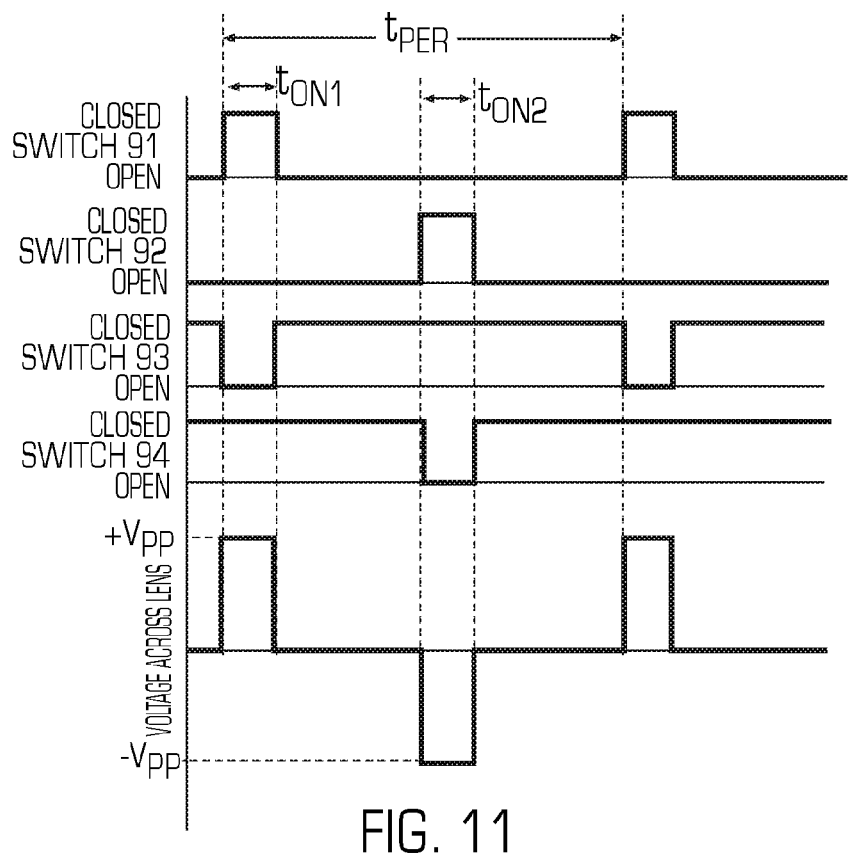
FIG. 11 is a timing diagram illustrating timing of control signals of switches of and control voltage from the pulse width modulation driver of FIG. 9 when providing a relatively low RMS amplitude output voltage.

FIGS. 10 and 11 are timing diagrams illustrating the timing of the opening and closing of the switches 91, 92, 93, and 94 of the H-bridge switch matrix 90 and the output voltage provided to the electroactive lens 98. FIG. 10 shows the timing for a relatively high RMS output voltage. FIG. 11 shows the timing for a relatively low RMS output voltage. A relatively high RMS output voltage is a voltage near the full scale output amplitude where the duty cycle approaches one (1), whereas a relatively low RMS output voltage is a voltage near zero output amplitude where the duty cycle approaches zero (0). The controller 95 controls duty cycle by controlling the timing of the opening and closing of the switches 91, 92, 93, and 94, and thus controls the output RMS amplitude. The duty cycle (D) is given by: D=(tON1+tON2)/tPER, where the time tON1 is the time that switches 91 and 94 are on, the time tON2 is the time that switches 92 and 93 are on (closed), and the time tPER is the time period of the cycle of controlling the switches 91, 92, 93, and 94. The output amplitude of the driver in VRMS is given by: Vout(RMS)=VPP×square root (D).

Figure 12:
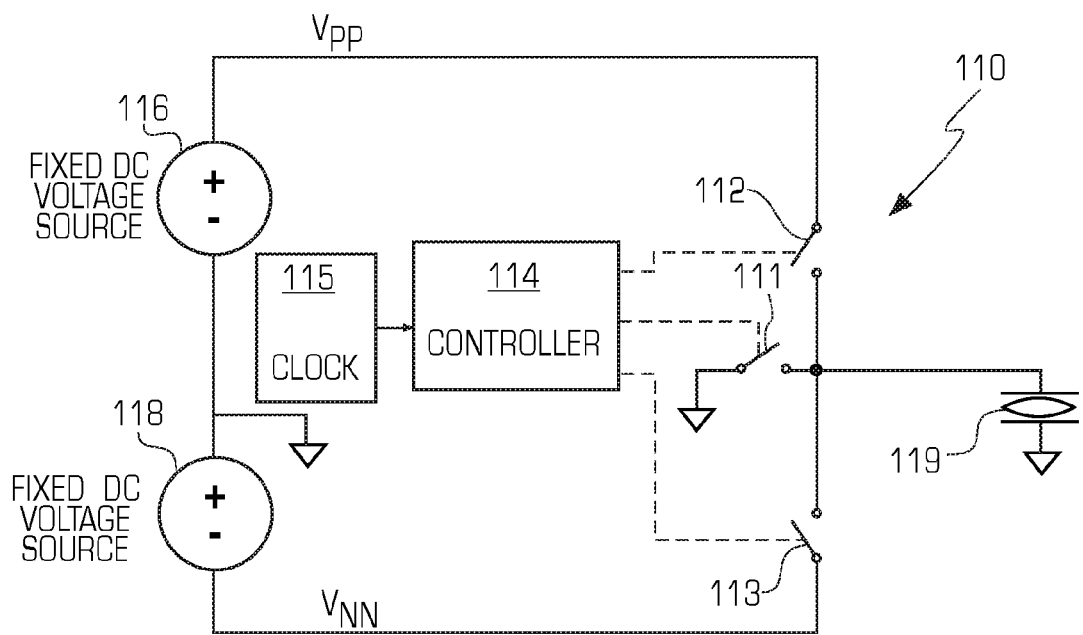
FIG. 12 is a schematic diagram illustrating a pulse width modulation driver receiving double fixed DC voltages in accordance with the present invention.

FIG. 12 is a schematic diagram illustrating a pulse width modulation driver receiving two fixed DC voltages in accordance with the present invention. The pulse width modulation driver comprises a half-bridge switch matrix 110, a controller 114, a clock 115, and a plurality of fixed DC voltage sources 116 and 118 for driving an electroactive lens 119. In response to the clock 115, the controller 114 controls the half-bridge switch matrix 110 to vary the duty cycle of the voltage waveform applied to the electroactive lens 119. In one embodiment, the plurality of fixed DC voltage sources 116 and 118 are bipolar fixed DC voltage supplies. The half-bridge switch matrix 110 comprises a plurality of switches 111, 112, and 113. The controller 114 provides control signals to the half-bridge switch matrix 110 for opening and closing the switches 111, 112, and 113 for selectively coupling voltages VPP and VNN, respectively, from the respective fixed DC voltage sources 116 and 118, and ground to the electroactive lens 119.

Figure 13:
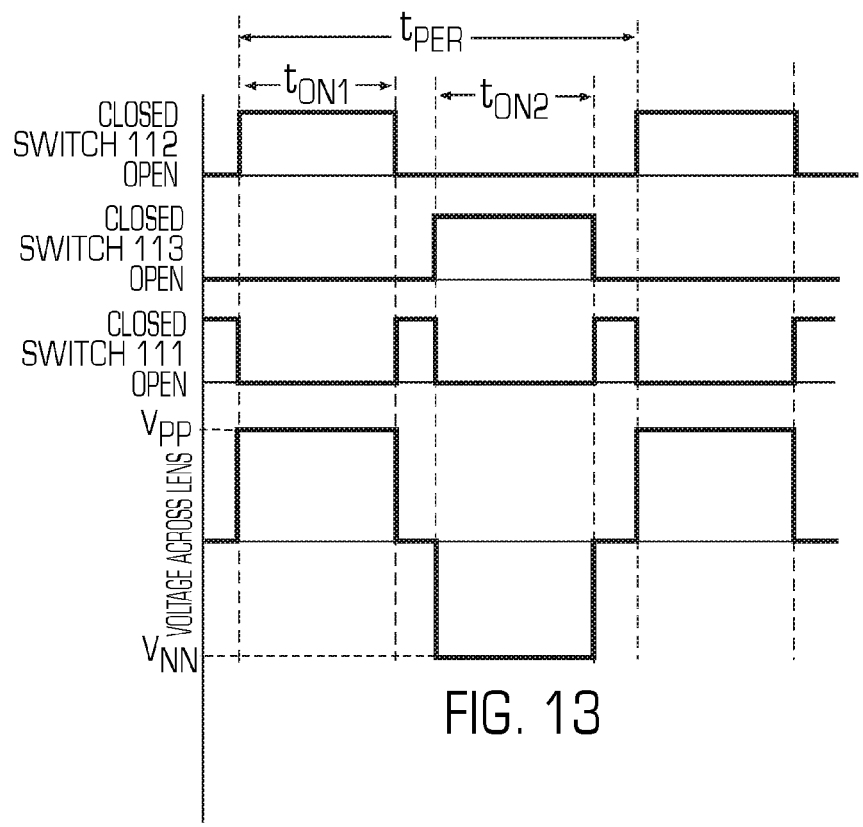
FIG. 13 is a timing diagram illustrating timing of control signals of switches of and control voltage from the pulse width modulation driver of FIG. 12 when providing a relatively high RMS amplitude output voltage.
Figure 14:
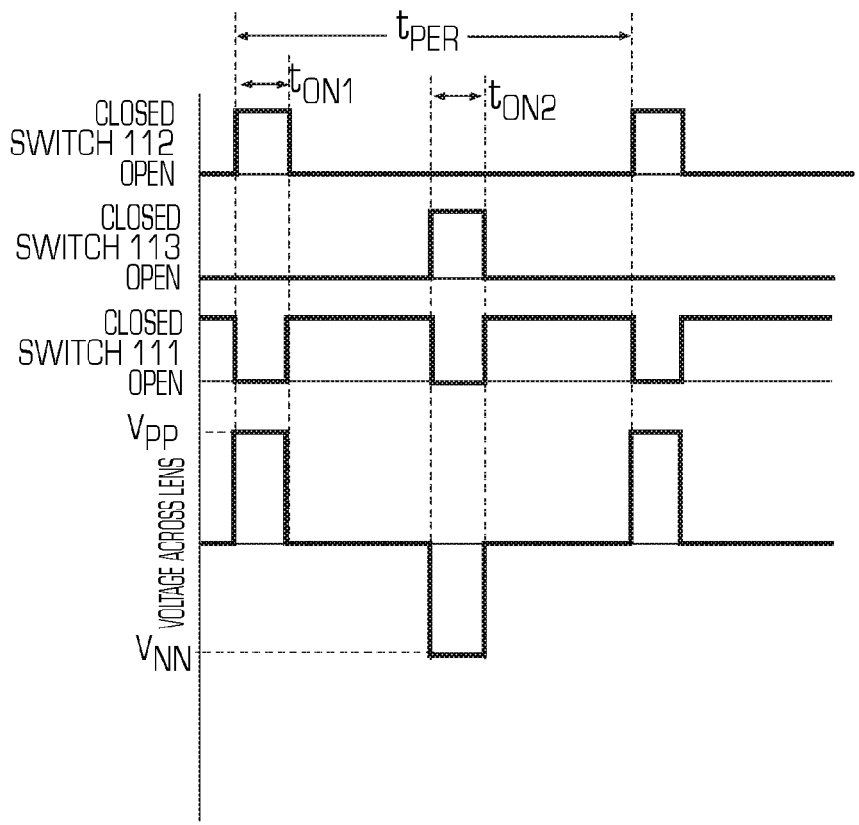
FIG. 14 is a timing diagram illustrating timing of control signals of switches of and control voltage from the pulse width modulation driver of FIG. 9 when providing a relatively low RMS amplitude output voltage

FIGS. 13 and 14 are timing diagrams illustrating timing of control signals to the switches 111, 112, and 113 and a control voltage from the pulse width modulation driver of FIG. 11 and applied to the electroactive lens 119. FIG. 13 shows the timing for a relatively high RMS output voltage. FIG. 14 shows the timing for a relatively low RMS output voltage. A relatively high RMS output voltage is a voltage near the full scale output amplitude where the duty cycle approaches one (1). A relatively low RMS output voltage is a voltage near zero output amplitude where the duty cycle approaches zero (0). In an illustrative embodiment, the magnitudes of the voltages VPP and VNN are the same. The duty cycle (D) is given by: D=(tON1+tON2)/tPER, where the time tON1 is the time that switch 112 (SW1) is on, the time tON2 is the time that switch 113 is on, and the time tPER is the time period of the cycle of controlling the switches 111, 112, and 113. The output amplitude of the driver in VRMS is given by: Vout (RMS)=VPP×square root (D).

In various embodiments, the electroactive lenses 56, 77, 98, and 119 may be liquid lenses or liquid crystal lenses.

In a method of present invention to operate the PWM driver of the present invention shown in FIG. 9, during a first period of time, switches 91 and 94 are turned on (closing switches 91 and 94), causing +Vpp to be supplied to the lens 98. During a later, second period of time, switches 92 and 93 are turned on (closing switches 92 and 93), causing −Vpp to be supplied to the lens 98. Between the first period of time and the second period of time, switches 91 and 92 are open while switches 93 and 94 are closed turning on switches 93 and 94, causing ground voltage to be supplied to the lens 98. The period of time by which the first period of time and the second period of time can be varied. In addition, the period of time between the first period of time when switches 91 and 94 are closed, and the second period of time when the switches 92 and 93 are closed may also be varied. This results in the waveform and timing diagrams shown in FIGS. 10 and 11.

Similarly, in the method of the present invention to operate the PWM drive of the present invention shown in FIG. 12, during a first period of time, switch 112 is turned on (closing switch 112), causing +Vpp to be supplied to the lens 119. During a later, second period of time, switch 113 is turned on (closing switch 113), causing —Vpp to be supplied to the lens 119. Between the first period of time and the second period of time, switch 111 is turned on closing switch 111, causing ground to be supplied to the lens 119. The result is the delivery of the waveform and timing diagrams shown in FIGS. 13 and 14.

In the foregoing description, various methods and apparatus, and specific embodiments are described. However, it should be obvious to one conversant in the art, various alternatives, modifications, and changes may be possible without departing from the spirit and the scope of the invention which is defined by the metes and bounds of the appended claims.

What is claimed is:

1. An electroactive lens driver comprising:
   means for generating a pulse width modulated waveform using a fixed DC voltage supply; and
   means for coupling said means for generating to an electroactive lens for pulse width modulating a power signal applied to the electroactive lens.

2. The electroactive lens driver of claim 1 wherein the electroactive lens is a liquid lens.

3. The electroactive lens driver of claim 1 wherein the electroactive lens is a liquid crystal lens.

4. An electroactive lens driver comprising:
   an H-bridge output stage comprising four controlled switches, the H-bridge output stage including output nodes for coupling to an electroactive lens; and
   a pulse width modulator coupled to the H-bridge output stage and providing a control voltage signal thereto to control the H-bridge output stage to provide a pulsed voltage signal to the electroactive lens and to vary a duty cycle of the pulsed voltage signal in response to the control voltage signal using a fixed value DC voltage supply.

5. The electroactive lens driver of claim 4 wherein the electroactive lens is a liquid lens.

6. The electroactive lens driver of claim 4 wherein the electroactive lens is a liquid crystal lens.

7. The electroactive lens driver of claim 4 further comprising a voltage source coupled to the H-bridge to provide a voltage signal thereto for generating said pulsed voltage signal.

8. The electroactive lens driver of claim 7 wherein the electroactive lens is a liquid lens.

9. The electroactive lens driver of claim 7 wherein the electroactive lens is a liquid crystal lens.

10. An electroactive lens driver comprising:
    a half-bridge comprising a pair of switches and including an output terminal for coupling to an electroactive lens;
    a controller coupled to the half-bridge; and
    a pulse width modulator to provide a pulsed voltage signal to the electroactive lens in response to a pair of external voltage signals and to vary a duty cycle of the pulsed voltage signal.

11. The electroactive lens driver of claim 10 wherein the electroactive lens is a liquid lens.

12. The electroactive lens driver of claim 10 wherein the electroactive lens is a liquid crystal lens.

13. The electroactive lens driver of claim 10 further comprising a fixed value DC positive voltage source and a fixed value DC negative voltage source coupled to the half-bridge for providing the pair of external voltage signals.

14. The electroactive lens driver of claim 13 wherein the electroactive lens is a liquid lens.

15. The electroactive lens driver of claim 13 wherein the electroactive lens is a liquid crystal lens.

16. A method for generating control signals for an electroactive lens, the method comprising:
    generating a first control signal to open a first plurality of switches and close a second plurality of switches in an H-bridge output stage coupled to the electroactive lens to apply a positive voltage across the electroactive lens;
    generating a second control signal to close the first plurality of switches and open the second plurality of switches in the H-bridge output stage to apply a negative voltage across the electroactive lens; and
    controlling the generating of the first and second control signal to vary the duty cycle of the positive and negative voltages applied to the electroactive lens using a constant DC voltage.

17. The method of claim 16 wherein the controlling the generating of the first and second control signal include controlling the timing of the opening and closing of the first and second plurality of switches to pulse width modulate the positive and negative voltages applied to the electroactive lens.

18. A method of operating an electroactive lens, the method comprising:
    generating a constant voltage source;
    generating a first control signal to open a first switch and closing a second switch in a switch matrix coupling the constant voltage source to the electroactive lens to apply a positive voltage from the constant voltage source across the electroactive lens;
    generating a second control signal to close the first switch and open the second switch in the switch matrix to apply a negative voltage from the constant voltage source across the electroactive lens; and
    generating a third control signal supplied to the switch matrix to vary the duty cycle of the positive and negative voltages and the time period therebetween applied to the electroactive lens.

19. The method of claim 18 wherein the third control signal is supplied to a third switch to close the third switch and to open the first and second switches.

* * * * *